United States Patent [19]
Taicher et al.

[11] Patent Number: 5,710,511
[45] Date of Patent: Jan. 20, 1998

[54] METHOD AND APPARATUS FOR EDDY CURRENT SUPPRESSION

[75] Inventors: Gersh Taicher; Arcady Reiderman, both of Rehovot, Israel

[73] Assignee: Western Atlas International, Inc., Houston, Tex.

[21] Appl. No.: 615,426

[22] Filed: Mar. 14, 1996

[51] Int. Cl.⁶ .................................................. G01V 3/00
[52] U.S. Cl. ........................................ 324/303; 324/323
[58] Field of Search ................................ 324/303, 300, 324/306, 307, 309, 323, 324, 333

[56] References Cited

U.S. PATENT DOCUMENTS

| | | | |
|---|---|---|---|
| 4,461,997 | 7/1984 | Ohmer | 324/323 |
| 5,233,304 | 8/1993 | Hubans | 324/323 |
| 5,280,243 | 1/1994 | Miller | 324/303 |
| 5,451,873 | 9/1995 | Freedman et al. | 324/303 |

*Primary Examiner*—Louis M. Arana
*Attorney, Agent, or Firm*—Richard A. Fagin

[57] ABSTRACT

An electromagnetic wellbore logging tool including an elongated sonde adapted for traversing the wellbore, a source of alternating current, an antenna connected to the source of alternating current, and a receiver circuit connected to the antenna. The receiver circuit provides an output corresponding to electromagnetic signals induced in the antenna. The invention includes at least one insulating insert disposed in an annular space between the exterior of the sonde and the wall of the wellbore. The insert extends in a direction so as to segment the paths of eddy current which would otherwise flow in the annular space. In a preferred embodiment, the logging tool includes a nuclear magnetic resonance apparatus having a longitudinal dipole antenna. The insulating inserts extend along the longitudinal axis of the tool so as to segment eddy current paths perpendicular to the longitudinal axis of the tool.

21 Claims, 5 Drawing Sheets

METHOD AND APPARATUS FOR EDDY CURRENT SUPPRESSION

BACKGROUND OF THE INVENTION

1. Field of the Invention

The present invention is related to the field of electromagnetic well logging apparatus. More specifically, the present invention is related to methods and apparatus for reducing the effect of eddy currents in the wellbore upon measurements made by various types of electromagnetic well logging instruments.

2. Description of the Related Art

Electromagnetic well logging instruments can be generally described as those types of instruments which induce alternating electromagnetic fields in earth formations surrounding wellbores, and measure various phenomena which occur as a result of interaction of the alternating electromagnetic fields with the earth formations surrounding the wellbore. The various phenomena are related to petrophysical properties of interest of the earth formations.

One type of electromagnetic well logging instrument is the induction resistivity tool. An induction resistivity tool is described, for example in U.S. Pat. No. 5,452,761 issued to Beard et al. The induction resistivity tool includes a source of alternating current (AC) which is passed through a transmitter on the instrument. The AC passing through the transmitter induces alternating electromagnetic fields in the wellbore and in the earth formations surrounding the tool. The alternating electromagnetic fields in turn induce eddy currents to flow in the wellbore and in the earth formations. The eddy currents are generally proportional in magnitude to the conductivity of the medium in which they are induced. The eddy currents can induce voltages in various receivers on the tool. The voltages generally correspond to the magnitude of the eddy currents.

A particular problem with induction resistivity tools occurs when a fluid, known as "drilling mud" and filling the wellbore during the drilling thereof, is highly electrically conductive. High conductivity of the drilling mud results when high concentrations of, among other things, sodium-, calcium- and/or potassium-chloride are included in the drilling mud. These chemicals are typically added to the drilling mud in order to reduce chemical interaction between certain earth formations and the drilling mud. The high concentrations of these salts in the drilling mud are useful in reducing "sloughing" or "washing" of certain earth formations, but the high conductivity resulting therefrom enables large eddy currents to flow within the wellbore when alternating electromagnetic fields are induced by an induction well logging instrument. The large eddy currents flowing in the wellbore can make it difficult to resolve the signals in the induction tool receivers which result only from eddy currents flowing within the earth formation. The resolution of formation signals is particularly difficult when the earth formation is not highly electrically conductive.

Another type of electromagnetic well logging instrument which suffers deleterious effects of conductive drilling mud is the nuclear magnetic resonance (NMR) instrument. An NMR instrument is described, for example, in U.S. Pat. No. 4,710,713 issued to Taicher et al. Another type of NMR instrument is described in U.S. Pat. No. 4,350,955 issued to Jackson et al. Both the Taicher et al '713 instrument and the Jackson et al '955 instrument include an antenna through which pulses of radio frequency (RF) energy are conducted. RF energy conducted through the antenna induces an RF magnetic field in the wellbore and in the earth formations surrounding the instrument. RF energy, of course, is a subset of the AC as is used in the transmitter of the induction tool, and just as with the induction tool, passing the RF energy through the antenna of the NMR instrument causes eddy currents to flow in the wellbore and in the earth formation surrounding the NMR instrument.

In the Jackson et al '955 patent, for example, the antenna acts, to a first approximation, as a three-dimensional dipole. The direction of a magnetic field generated by the antenna is generally along the direction of the dipole parallel to its longitudinal axis. This type of antenna is generally referred to as a longitudinal dipole. The antenna induces an RF magnetic field in the wellbore and in the earth formations surrounding the tool which decreases in magnitude as the third power of the radial distance from the axis of the center of the tool. Therefore, to induce an RF magnetic field in the earth formations having sufficient amplitude to make useful measurements requires that the antenna generate a very strong RF magnetic field in the wellbore. If the drilling mud is electrically conductive, significant losses of RF power will occur.

The apparatus disclosed in the Taicher et al '713 patent includes a substantially cylindrical permanent magnet assembly which is magnetized perpendicular to its longitudinal axis. The magnet may be considered as an infinitely long two-dimensional dipole for the purpose of this discussion. The magnet induces a static magnetic field in the wellbore and in the formations which has substantially uniform magnetic field strength within any thin annular cylindrical volume defining any particular radius from the axis of the magnet. The Taicher et al '713 apparatus also includes an antenna for generating the RF magnetic field and for receiving the NMR signals. The antenna may be considered, for the purposes of this discussion, as an infinitely long two-dimensional dipole. The direction of the magnetic field generated by this antenna is generally perpendicular to its longitudinal axis; this type of antenna is generally referred to as a transversal dipole antenna. The permanent magnet dipole is coaxial with and orthogonal to the RF dipole.

The apparatus disclosed in the Taicher et al '713 patent is subject to several drawbacks. Notably, the antenna induces an RF magnetic field in the formations surrounding the tool which decreases in strength as the square of the radial distance from the axis of the magnet. Therefore, to induce an RF magnetic field in the earth formations having sufficient amplitude within the sensitive region, the antenna must generate a very strong RF magnetic field in the wellbore. Since the drilling mud is electrically conductive, significant losses of RF power occur. The problem is similar to that facing the apparatus in the Jackson et al '955 patent.

Generally speaking, the drawbacks of electromagnetic well logging instruments when used in wellbores having conductive drilling mud can be described as follows: first, that the drilling mud can have variable conductivity as a result of different drilling mud salt concentrations and different temperatures. Variable conductivity can lead to extreme variability of the eddy current losses. As a consequence, loading and impedance of the antenna on the NMR tool, or the transmitter and receivers on the induction tool, can vary over a wide range. In such cases, optimum matching to a transmitter circuit and to a receiver circuit is difficult. Matching to the transmitter of the NMR tool is the most problematic because a predetermined value of RF power has to be generated within the sensitive region in order to make correct NMR measurements. Further, when the antenna and the transmitter are mismatched, some of RF power is reflected from the antenna and heats the transmitter circuit. It is known that at low values of drilling mud resistivity, the NMR tools known in the art are not functional.

Second, the conductive drilling mud not only reduces the transmitted electromagnetic power, but also attenuates the received signal to an unknown and variable degree. To deal with this particular problem may require a complicated and expensive calibration procedure.

Third, the amount of power which can be effectively passed through the transmitter may be limited, particularly in NMR logging tools. Generally, higher peak power requires higher voltages to be impressed on the antenna. In certain cases the voltage required could exceed the limitations of some electronic components in the tool. High average power in the transmitter can result in excessive heating of the transmitter. For NMR well logging tools it can be difficult to generate more than 100 measurement cycles (known as spin-echoes) in conductive wellbores without overheating the transmitter.

Fourth, the stability of the instrument's response, particularly the response of NMR tools, can be adversely affected. A variable RF magnetic field amplitude, variability in attenuation of received NMR signal, and variability of Q of the receiver while receiving can cause difficulty in calibration of the receiver.

Fifth, for NMR logging tools the excitation frequency bandwidth of the RF magnetic field is proportional to the RF power pulse amplitude (short pulses). Moreover, for NMR tools such as the one described in the Taicher et al '713 patent using a static magnetic field having an amplitude gradient, the thickness of the excited region (the sensitive volume) is proportional to the excitation frequency bandwidth. Tool motion problems are therefore reduced when RF amplitude is high. Large eddy currents flowing in the wellbore make it difficult to achieve high RF magnetic field amplitude in the earth formations.

Finally, the signal to noise ratio (S/N) of electromagnetic well logging instruments, particularly NMR tools, is generally greater at higher values of Q of the antenna. The relationship of S/N with respect to Q of the antenna is a primarily matter of specific tool geometry. High magnitudes of eddy current flowing in the wellbore restrict the Q of the antenna, thereby restricting the useful geometry of the instrument.

Accordingly it is an object of the present invention to provide an apparatus and method for reducing the deleterious effects of eddy current on electromagnetic well logging apparatus.

SUMMARY OF THE INVENTION

The invention is an electromagnetic wellbore logging tool including an elongated sonde adapted for traversing the wellbore, a source of alternating current, an antenna connected to the source of alternating current, and a receiver circuit connected to the antenna. The receiver circuit provides an output corresponding to electromagnetic signals induced in the antenna. The invention further includes at least one insulating insert disposed in an annular space between the exterior of the sonde and the wall of the wellbore. The insert extends in a direction so as to segment paths of eddy current which would otherwise flow in the annular space.

In a preferred embodiment of the invention, the logging tool includes a nuclear magnetic resonance apparatus having a longitudinal dipole antenna. The insulating inserts extend along the longitudinal axis of the tool so as to segment eddy currents which would otherwise flow perpendicular to the longitudinal axis of the tool.

Another embodiment of the invention includes an electromagnetic induction resistivity tool having a transmitter coil and a receiver coil axially spaced apart from the transmitter along the sonde. The inserts extend substantially parallel to the axis of the sonde to segment paths of eddy currents which would otherwise flow perpendicular to the axis of the sonde.

DESCRIPTION OF THE PREFERRED EMBODIMENT

The description of the invention herein includes both electromagnetic induction well logging apparatus and nuclear magnetic resonance (NMR) well logging apparatus. While the antenna terminology known in the art relative to induction apparatus and NMR apparatus is somewhat different, the physical principles affecting their operation are substantially the same. In particular, the induction logging apparatus includes so-called "transmitters" and "receivers", which perform substantially the same function as the "antenna" as described in the discussion of the NMR apparatus. More particularly, induction logging apparatus typically include transmitter coils and receiver coils which can be configured to perform as either longitudinal dipole antennas or transverse dipole antennas. Accordingly, the description herein is applicable to an induction logging tool having the corresponding antenna type.

Figure 1:
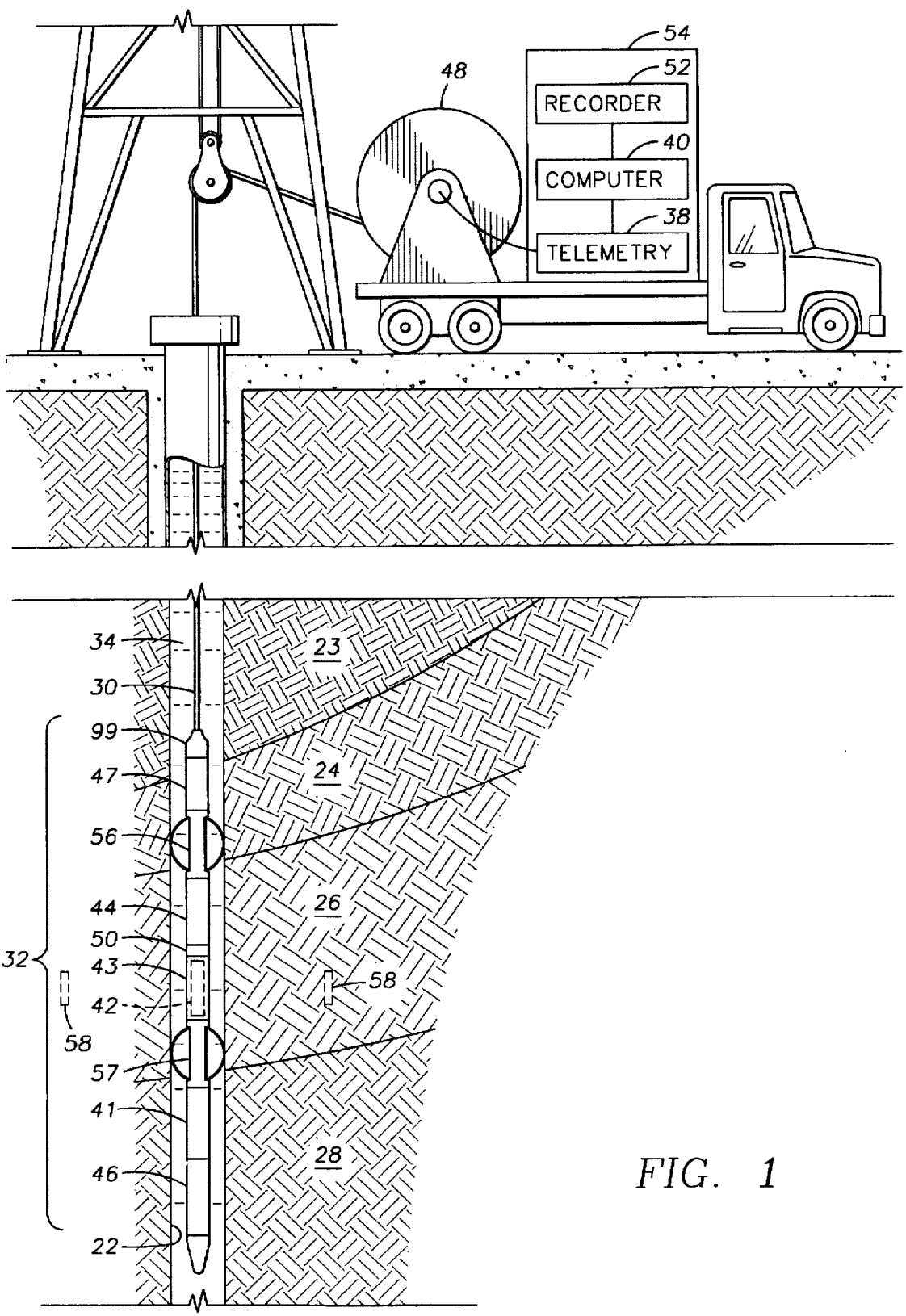
FIG. 1 shows a nuclear magnetic resonance (NMR) well logging apparatus disposed in a wellbore penetrating earth formations.

FIG. 1 shows a well logging apparatus disposed in a wellbore 22 penetrating earth formations for making measurements of properties of the earth formations. The wellbore 22 in FIG. 1 is typically filled with a fluid 34 known in the art as "drilling mud". It is a common practice to use substantial concentrations of, among other things, sodium-, calcium- and/or potassium-chloride in the drilling mud 34. These compounds are typically added to the drilling mud 34 in order to reduce chemical interaction between the drilling mud 34 certain earth formations, such as "shales". High concentrations of these compounds in the drilling mud 34 can be useful in reducing "sloughing" or "washing" of the shales.

High concentrations of these compounds in the drilling mud 34, when combined with the effect of high temperatures in the deeper portions of the wellbore 22, result in the drilling mud 34 having low resistivity (high conductivity). The significance of the high conductivity of the drilling mud 34 will be further explained.

A string of logging tools 32, which can include a nuclear magnetic resonance (NMR) apparatus, or alternatively, an electromagnetic induction well logging apparatus, is typically lowered into the wellbore 22 by a means of an armored electrical cable 30.

The present invention will be explained as to its application with NMR well logging apparatus for convenience. Throughout this description is should be remembered that the description provided herein is equally applicable to induction logging apparatus. An NMR probe 42 can be included in the tool string 32. When the NMR probe 42 is included, the tool string 32 is preferably centered within the wellbore 22 by means of a top centralizer 56 and a bottom centralizer 57 attached to the tool string 32 at axially spaced apart locations. The centralizers 56, 57 can be of types known in the an such as bowsprings. Other well logging sensors (not shown separately for clarity of the illustration in FIG. 1) may form pan of the tool string 32. An NMR probe which can be used with the present invention is described, for example in U.S. Pat. No. 4,350,955 issued to Jackson et al. The apparatus disclosed in the Jackson et al '955 patent is described herein only to show the structure of an NMR probe having an antenna configuration which will operate with one embodiment of the present invention. The NMR probe disclosed in the Jackson et al '955 is in no way meant to be an exclusive representation of NMR apparatus which will function with the present invention, and accordingly, should not be construed as a limitation on the invention. The NMR probe in the Jackson et al '955 patent includes a wire coil which acts as a longitudinal dipole antenna.

Figure 2:
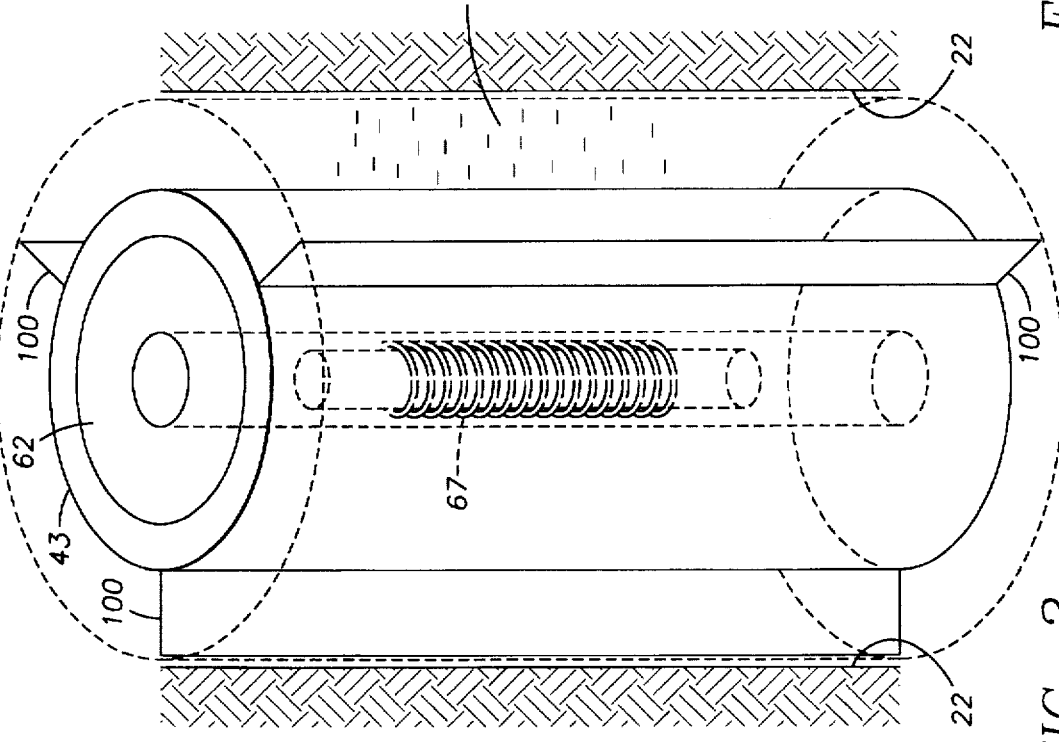
FIG. 2 shows eddy current suppression inserts for use with a longitudinal antenna of the NMR apparatus of FIG. 1.

FIG. 2 shows the NMR probe 42 schematically, including one embodiment of eddy current insulating inserts 100 according to the present invention. The NMR probe 42 in FIG. 2 is shown only in enough detail to illustrate the positioning of the inserts 100 according to the present invention. The NMR probe 42 therefore is only shown as a magnet 62, transceiver antenna 67, outer protective housing 43, and the inserts 100. An annular space between the wellbore 22 and the exterior of the housing 43 is shown filled with the drilling mud 34.

The inserts 100 as shown in FIG. 2 are configured to be used with longitudinal dipole antennas, such as the transceiver antenna shown at 67. The inserts 100 are typically attached to the exterior of the probe 42 at radially separated locations. The manner of attaching the inserts 100 will be further explained. The inserts 100 should substantially traverse the annular space between the exterior of the housing 43 and the wall of the wellbore 22. The inserts 100 are positioned so as to extend substantially parallel to the longitudinal axis of the probe 42. The inserts 100 traversing the annular space are intended to stop flow of eddy currents in the wellbore 22 along substantially circular paths in planes perpendicular to the longitudinal axis of the probe 42. As is understood by those skilled in the art, alternating current passed through a longitudinal dipole antenna, such as the one shown at 67, generate alternating electromagnetic fields in the media surrounding the antenna 67. The alternating electromagnetic fields induce eddy currents which flow along substantially circular paths in planes perpendicular to the antenna 67. By interrupting the circular paths, the inserts 100 change the spatial distribution of the eddy currents flowing in the annular space between the housing 43 and the wellbore 22. Considerations for determining the number of inserts 100 to be attached to the housing 43 will be further explained.

The inserts 100 should be made from an electrically non-conductive material. NMR probes 42 of types known in the art typically have housings 43 made from a non-conductive cover 43 surrounding the magnet 62 in order to exclude the drilling mud 34 from entering the probe 42. The cover 43 is typically composed of fiberglass or similar rigid non-conductive material. As a matter of convenience for the system designer, it is contemplated that the inserts 100 and the housing 43 can be molded into a single assembly, however this is not to be construed as a limitation on the construction of the housing 43 and the inserts 100. It is essential to the invention only that the inserts 100 be non-conductive and substantially traverse the annular space between the exterior of the housing 43 and the wall of the wellbore 22 in order to interrupt the continuous electrically conductive path which is created in the annular space between the cover 43 and the wellbore 22.

The configuration of the inserts 100 allows the drilling mud 34 to freely move past the probe 42 without substantial hydraulic resistance when the probe 42 is inserted into or withdrawn from the wellbore 22.

Figure 3:
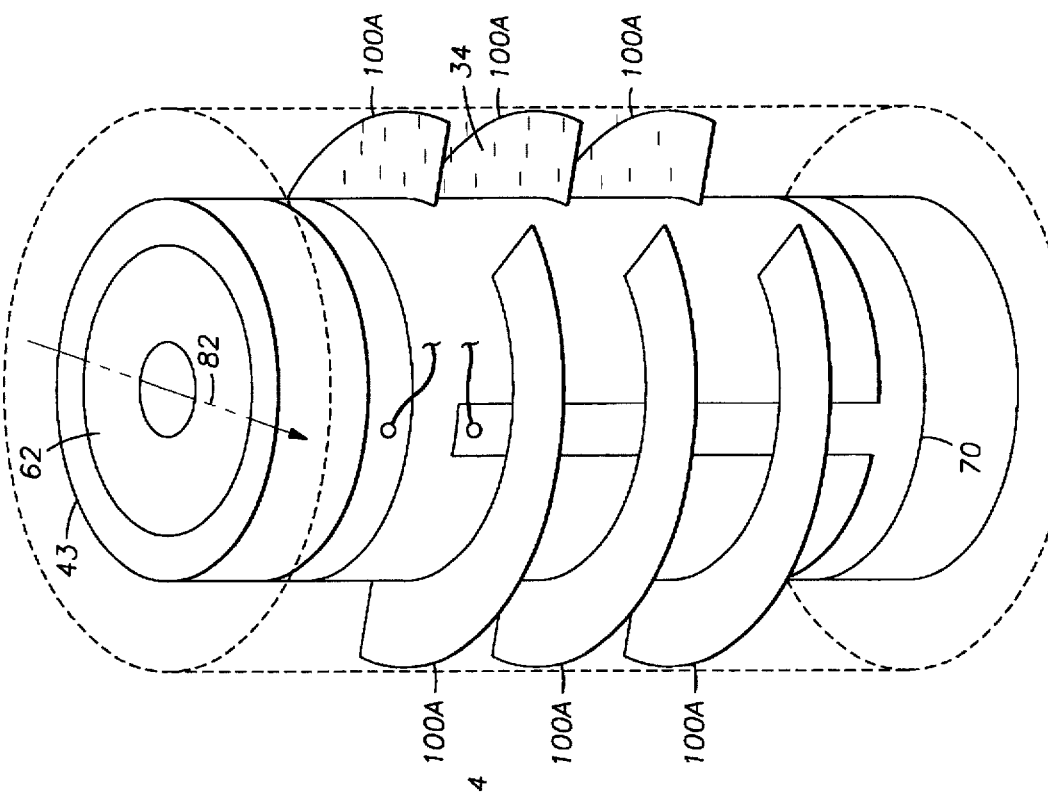
FIG. 3 shows eddy current suppression inserts for use with the transversal antenna of the NMR apparatus of FIG. 1.

FIG. 3 shows an alternative configuration of the inserts 100 for use with NMR probes having transversal dipole antennas. The antenna is shown in FIG. 3 at 70. An NMR probe 42 which includes a transversal dipole antenna is described, for example, in U.S. Pat. No. 4,710,713 issued to Taicher et al. The NMR probe described in the Taicher et al '713 patent is disclosed herein only to explain the operation of the inserts 100A of the present invention when used with an NMR probe having a transversal dipole antenna, and is not to be construed as a limitation on the invention. The NMR probe 42 shown in FIG. 3 is shown in very rough schematic form as is the probe in FIG. 2, in order to explain the positioning and function of the inserts 100A.

As in the first embodiment of the invention, the inserts 100A should be made from a non-conductive material. The inserts 100A in FIG. 3 can also be molded into a single assembly together with the housing 43, but as with the first embodiment of the inserts (shown as 100 in FIG. 2), this method of construction is not to be construed as a limitation on the invention. In the configuration of FIG. 3, the inserts 100A can extend around the circumference of the probe 42 substantially perpendicularly to the longitudinal axis of the probe 42. As will be further explained, it has also been determined that substantial reduction in eddy current losses can be obtained even when the inserts do not completely circumscribe the annular space between the exterior of the probe 42 and the wall of the wellbore 22. The inserts 100A as shown in FIG. 3 need only partially circumscribe the exterior of the probe 42, and should preferably be located proximal to the part of the antenna 70 which is parallel to the longitudinal axis of the probe 42. This part of the antenna will typically be located along a magnetization axis 82 of the magnet 62. The fact that the inserts 100A need not completely circumscribe the exterior of the probe 42 is important because hydraulic forces would substantially prevent insertion of the probe 42 into the wellbore 22 were the inserts 100A to completely circumscribe the probe 42.

A plurality of the inserts 100A can be positioned along the exterior of the probe 42 at axially spaced apart locations which fall substantially within the axial span of the antenna 70. The radial location of all the inserts 100A should be proximal to the part of the antenna 70 which extends parallel to the longitudinal axis of the probe 42. Considerations for determining the number of inserts 100A which should be included on the probe 42 will be further explained.

Figure 4B:
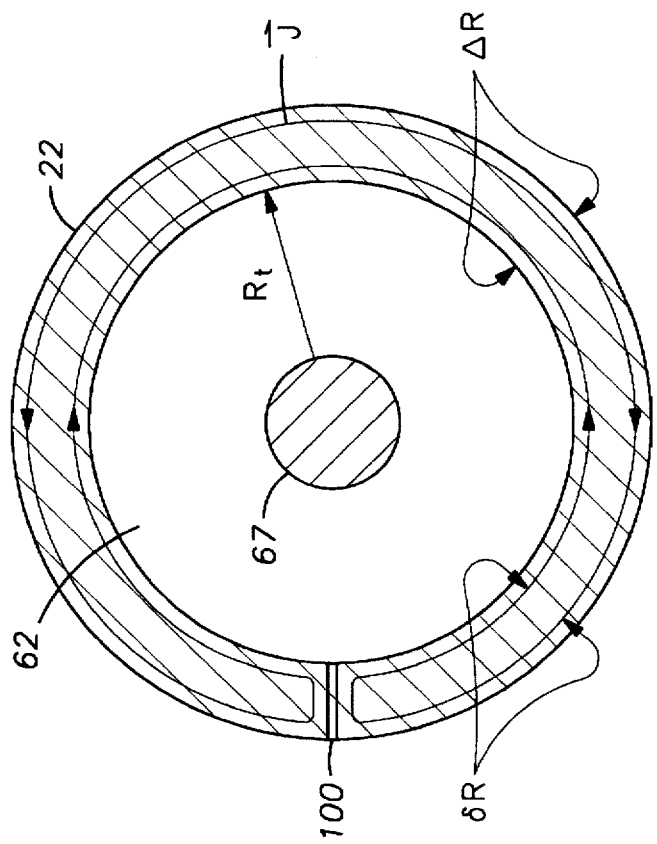
FIG. 4B shows the eddy current lines after insertion of one eddy current suppression insert for the infinitely long longitudinal antenna.
Figure 4A:
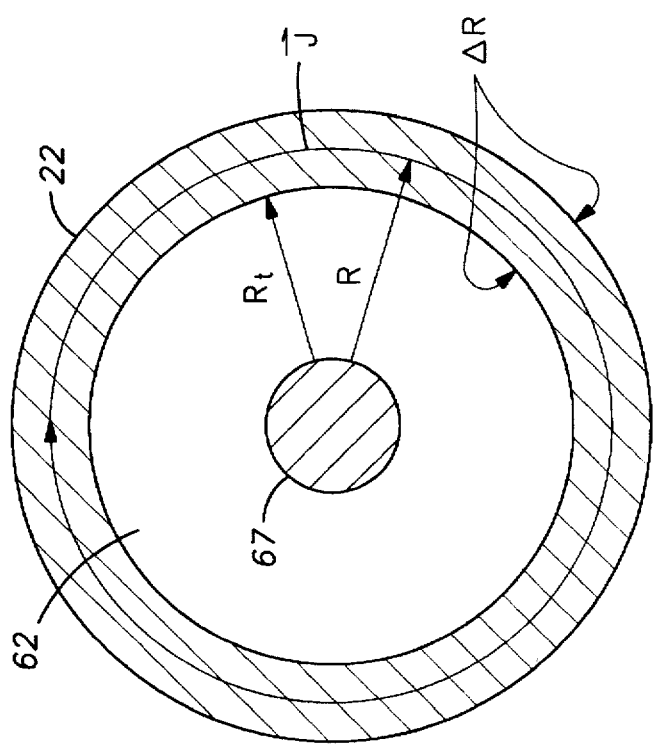
FIG. 4A shows a diagrammatic representation of eddy current lines before insertion of the eddy current suppression inserts for an infinitely long longitudinal antenna.

Referring now to FIGS. 4A and 4B, the principles of operation of the first embodiment of the eddy current spoiling inserts (shown in FIG. 2) will be explained. FIG. 4A shows the paths of the eddy current without the inserts 100. FIG. 4B shows the eddy current path when a single insert 100 is included on the probe 42.

Referring first to FIG. 4A, a simplified model for eddy current distribution without the insert 100 is presented. The system shown in FIG. 4A is substantially Axially symmetric, and results therefore in the eddy current density j lines to be substantially in circles formed around the probe 42 and wellbore 22 longitudinal axes. Maxwell's form of Faraday's law (see, for example, W. K. H. Panofsky and M. Phillips, "Classical Electricity and Magnetism", Addison-Wesley Publishing Company, Inc. 1962, p. 159) for the complex amplitudes of the electric and magnetic vectors in case of harmonic time dependence of the alternating current flowing through the antenna 67 can be described by the following relationship:

$$\oint E dl = -\omega \Phi_{IA} \qquad (1)$$

where $\omega$ represents the angular frequency of the alternating current $E = j/\rho$ wherein $\rho$ represents the resistivity of the drilling mud 34; the intergal is taken along the eddy current density line at a radius R and $\Phi_{IA}$ is the time dependent magnetic flux threading the area within the circle of radius R (R is in the interval ($R_r$, $R_r + \Delta R$)) which is approximately equal to the magnetic flux through the cross-section of a ferrite rod (not shown separately) which can be disposed within the transceiver antenna 67. This magnetic flux is equal to $(\pi d^2/4) B_f$ wherein $B_f = \mu_0 \mu_{rod} I_1 N/l$ represents the magnetic flux density in the ferrite rod, $\mu_0$ represents the magnetic permeability of free space, $\mu_{rod}$ represents the magnetic permeability of the ferrite rod 68; d represents the diameter of the ferrite rod, $I_1$ represents the current flowing in the antenna 67, n represents the number of coil turns in the antenna's coil windings, and l represents the antenna 67 length. In terms of magnetic charges $q^m$ it is possible to rewrite the expression for the magnetic flux as $\Phi_{IA} = q^m$. This expression assumes that the secondary magnetic field produced by the eddy current does not substantially contribute to $\Phi_{IA}$. This assumption is typically valid for the case of low conductivity media (because the dimensions considered are much smaller than the skin-layer depth). Substituting in equation (1) according to the expressions above yields the following expression for the eddy current density:

$$j = \Phi q^m / (2\pi R \rho) \qquad (2)$$

The RF power loss $P_{ec}$ due to the eddy currents can be determined by the integral of: the current density j squared divided by the volume of the drilling mud 34. This is shown in the following expression:

$$P_{ec} = \rho \int j^2 dv \qquad (3)$$

For the eddy current distribution shown in FIG. 4A without an insert, by substituting for equation (3) and integrating, results in the following expression for RF power loss due to the eddy current:

$$(P_{ec})_{IA} = l (\Phi q^m)^2 \ln(1 + \Delta R / R_r) / (2\pi \rho) \qquad (4)$$

FIG. 4B shows the eddy current density j lines when the annular space between the probe 42 and the wall of the wellbore 22 is interrupted with a single insert 100. Due to the presence of the insert 100 the eddy current path can not close so as to enclose the total magnetic flux from the antenna 67. The RF magnetic flux causing the eddy current in the presence of the insert can be described approximately as $\Phi_{IB} = 2\pi R_{av} \delta R B_{1av}$ where $2\pi R_m$ and $\delta R$ represent, respectively, the length and the width of the region enclosed by an eddy current line, $R_{av} \approx R_r + \Delta R/2$ is the mean radius of the annular space and $B_{1av}$ is the mean RF field $B_r$ within the annular space. Substituting $\Phi_{IB}$ into equation (1) and integrating j over an eddy current line yields the following expression for eddy current density:

$$j = \Phi B_{1av} [2\pi R_{av} \delta R / (\pi R + 2\pi R_{av})] / \rho \qquad (5)$$

A simplified expression for the field radiating from the longitudial anteana 67 can be shown as:

$$B_1 = q^m (l/4\pi) / [R^2 + (l/2)^2]^{3/2} \qquad (6)$$

Further assuming that $l >> R_r$, it can be shown that $B_{1av} \approx B_1 = (2/\pi) q^m / l^2$, which yields the following expression for the eddy current density in the presence of the insert 100:

$$j = 2\omega q^m [2\pi R_{av} \delta R / (\delta R + 2\pi R_{av})] / (\pi \rho l^2) \qquad (7)$$

In the case where $\delta R << 2\pi R_{av}$, then the current density can be expressed as:

$$j = 2\omega q^m \delta R / (\pi \rho l^2) \qquad (8)$$

The RF power loss $(P_{ec})_{IB}$ corresponding to the case presented in FIG. 4B can be calculated according to the following expression:

$$(P_{ec})_{IB} = (\omega q^m)^2 \pi R_{av} (\Delta R/l)^3 / (3\pi \rho) \qquad (9)$$

By calculating the ratio $(P_{ec})_{IB} / (P_{ec})_{IA}$ it is possible to estimate the effect of the insert 100 as:

$$(P_{ec})_{IB} / (P_{ec})_{IA} = (16/3)(R_{av}/l)(\Delta R/l)^3 / \ln(1 + \Delta R / R_A) \qquad (10)$$

Typical values are: $R_r = 2"$; $\Delta R = 1"$; $l = 10"$. The ratio thus computed provides a value of: $(P_{ec})_{IB} / (P_{ec})_{IA} = 0.0027$. When an the end effects on the longitudinal dipole antenna are ignored, the eddy current loss becomes insignificant even when only a single insert 100 is used.

As a practical matter most of the eddy current losses occur at the ends of the longitudinal dipole antenna 67. For typical values of a ratio of the dipole antenna 67 length with respect to the diameter of the wellbore 22 the eddy current flowing near the ends of the antenna 67 cause most of the eddy current loss in the presence of the insulating inserts 100.

Figure 5B:
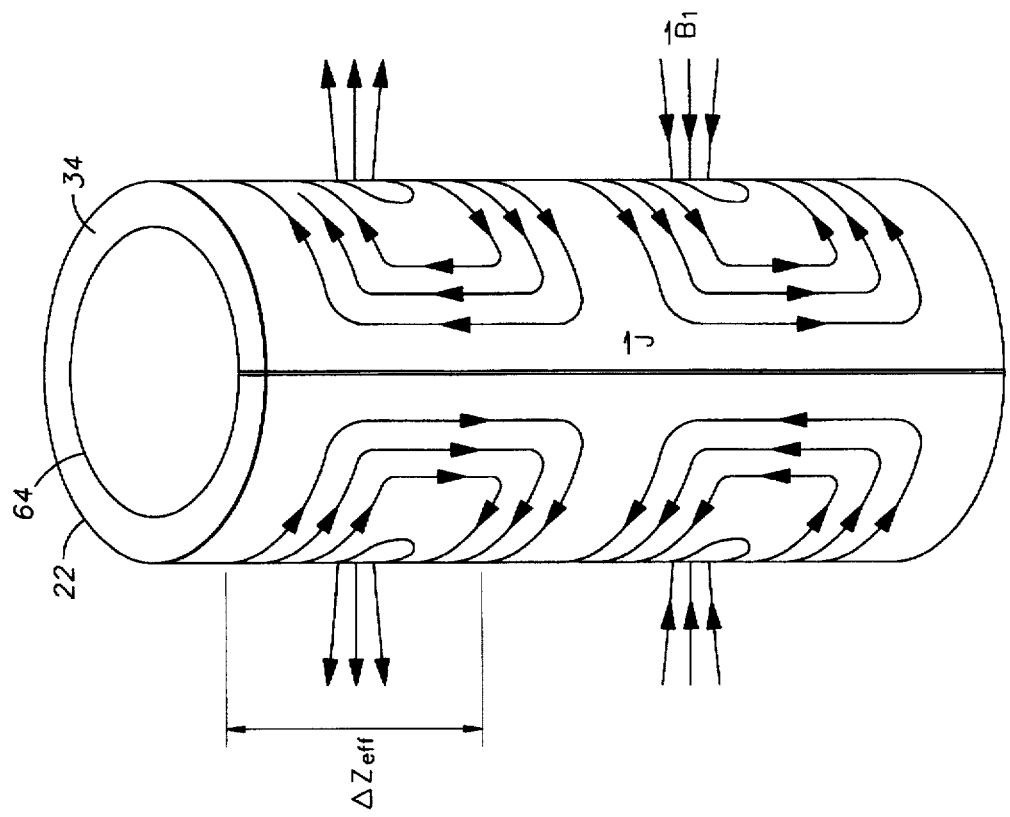
FIG. 5 shows the eddy current lines before and after of the insertion of the eddy current suppression inserts of the NMR apparatus of FIG. 2.
Figure 5A:
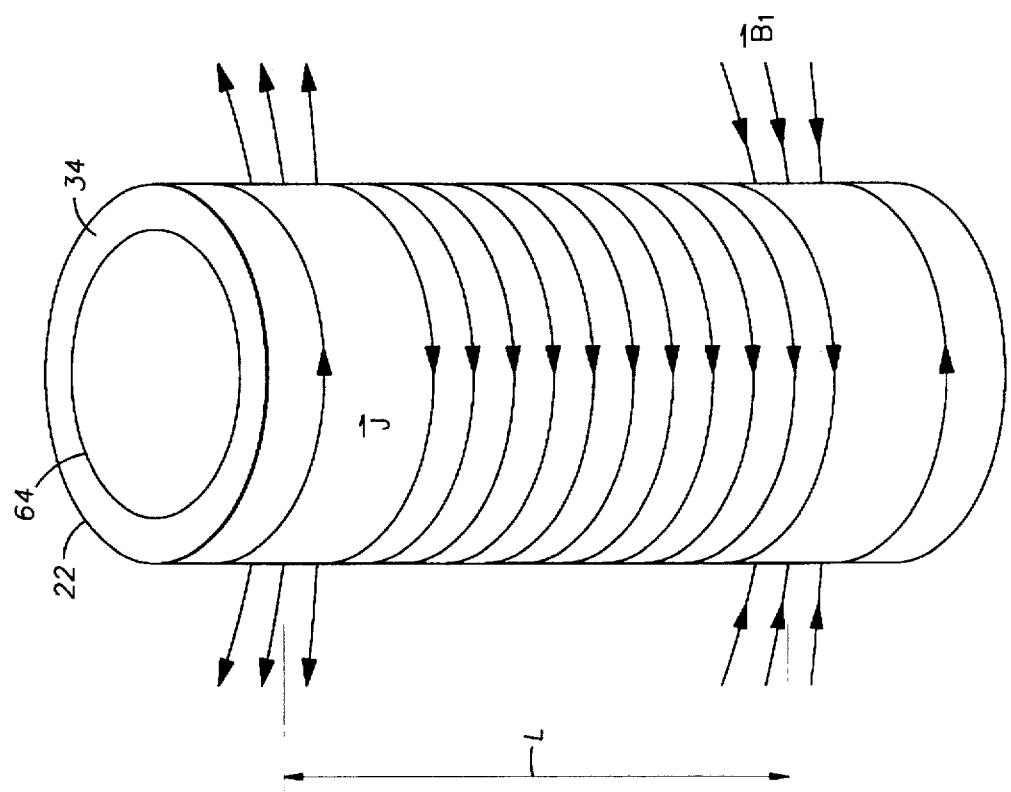

Referring to FIGS. 5A and 5B, the eddy current paths for a finite length longitudinal dipole antenna (such as 67 in FIG. 2) are shown for uninterrupted (in FIG. 5A) and interrupted with a single insert (in FIG. 5B). For the interrupted annular space as shown in FIG. 5A, the eddy current lines cluster about the ends of the antenna 67 in the vicinity of magnetic charges $q_m$. The magnetic field which effectively excites the eddy currents in this case is the radial component $B_R$ of the field of the magnetic charge. Within the drilling mud (34 in FIG. 1) this field can be represented by the following expression:

$$B_R = q^m / [4\pi (R_{av}^2 + Z^2)] \qquad (11)$$

wherein the Z-axis origin is chosen at the position of the magnetic charge. The effective length $\Delta Z_{eff}$ of the eddy current path in the Z-axis direction can be determined from the condition that the effective mean eddy current line closes the total magnetic flux (according to the Gauss's theorem it is equal to $q'''$) with flux density $B_R = B_R(Z=0)$. Then $\Delta Z_{eff}$ can be determined as $\Delta Z_{eff} = 2R_{av}$. Thus, for the effective eddy current path can be calculated as: $2(2\pi R_{av} + 2R_{av})$ and after substituting into equation (1):

$$j = \omega q''' / [4\pi R_{av} \rho (1 + 1/\pi)] \qquad (12)$$

The RF power loss can be calculated as:

$$(Pec)_{LB} = [1/(1+1/\pi)]^2 (\omega q''')^2 \Delta R/(2\pi\rho) \qquad (13)$$

For the case of N inserts radially separated by 360/N degrees from each other the RF power loss can be expressed as:

$$(P_{ec})_{LB} = [1/(1+N/\pi)]^2 (\omega q''')^2 \Delta R/(2\pi\rho) \qquad (14)$$

Comparing with equation (4):

$$(P_{ec})_{LB}/(P_{ec})_{LA} = [1/(1+N/\pi)]^2 R_l / l \qquad (15)$$

The effect of the inserts on the RF power loss for the longitudinal dipole antenna 67 is evident from equation (15). For example, for $R_l = 2''$, $l = 10''$ the ratio is equal to 0.15 for N=1; and the ratio is equal to 0.1 for N=3.

It is significant to note that about 85 percent of the power loss due to eddy current can be avoided by using only one insert 100. As is understood by those skilled in the art, as a practical matter the configuration shown in FIG. 2 may be difficult to use in some wellbores due to friction between the inserts 100 and the wellbore 22 wall. As shown by the results calculated from equation (15), a substantial portion of the reduction in eddy current losses can be obtained by using only one insert 100 on the longitudinal dipole antenna 67. Using only one, or perhaps two of the inserts 100 can substantially improve the ease with which the probe 42 can be inserted into and withdrawn from the wellbore 22, and increases the range of diameters of the wellbore 22 for which a single width insert 100 is useful.

While the calculations for eddy current loss reduction are directed to an embodiment including an NMR probe, it is to be explicitly understood that the apparatus disclosed herein, and the power loss calculations shown therefor, are equally applicable to use with induction well logging instruments. The theory of induction well logging instruments is well known in the art, and is described for example in "Basic Theory of Induction Logging and Application to Study of Two-Coil Sondes", J. H. Moran and K. S. Kunz, Geophysics, vol. 27, no. 6, pp 829–858, Society of Exploration Geophysicists, 1962. As is also known in the art, induction well logging instruments typically include transmitter coils and receiver coils which act as longitudinal dipole antennas. See, for example, U.S. Pat. No. 3,147,429 issued to Moran. It is to be explicitly understood that the Moran and Kunz reference and the Moran '429 patent are meant only to provide examples of induction logging theory and apparatus, and are not meant to limit the present invention. In the case of induction logging instruments, it is preferable that the effective length of the inserts 100 traverse the entire span between the transmitter coils and the receiver coils on the induction logging sonde because eddy currents particularly traverse the annular space between the transmitter coils and receiver coils of induction logging sondes.

Figure 6B:
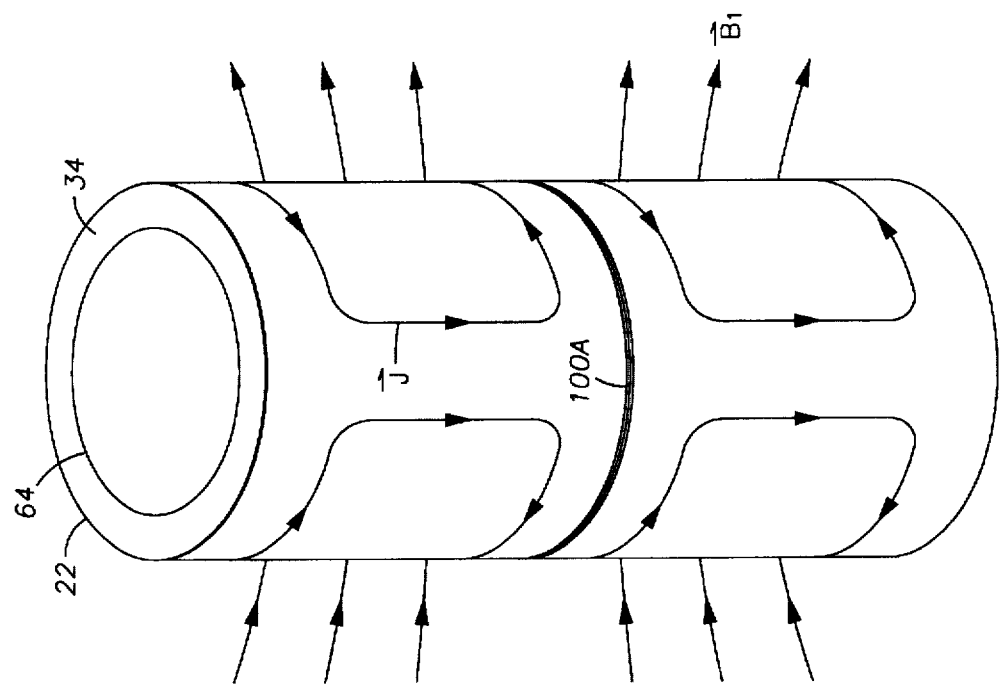
FIG. 6 shows the eddy current lines before and after of the insertion of the eddy current suppression inserts of the NMR apparatus of FIG. 3.
Figure 6A:
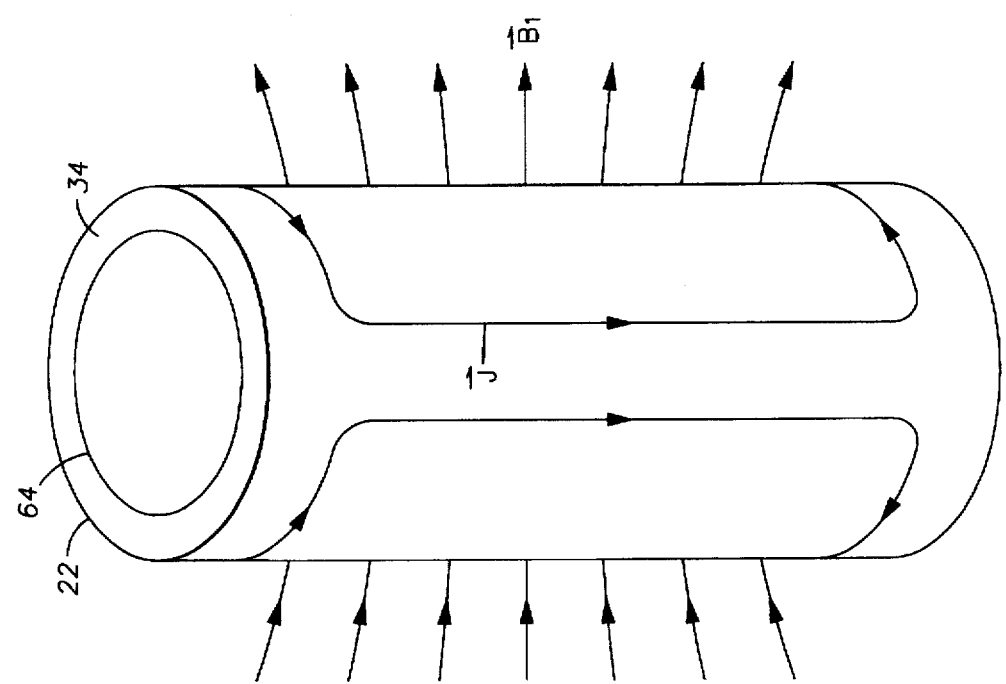

FIG. 6A shows the eddy current patterns for the transversal dipole antenna (such as the one shown in FIG. 3 at 70). FIG. 6B shows the eddy current patterns for the transversal dipole antenna when a single insert (such as 100A in FIG. 3) is attached to the exterior of the probe (42 in FIG. 3). A simplified configuration of the eddy current lines allows calculation of the eddy current power loss by the following expression:

$$(P_{ec})_t = [1/(N1+1/\pi R_{av})]^2 (\omega q''')^2 (1/R_{av})^3 \Delta R/(8\pi\rho) \qquad (16)$$

where N represents the number of equidistant axially spaced apart inserts (100A as shown in FIG. 3).

The power loss ratio can be determined by the expression:

$$(P_{ec})_{tB}/(P_{ec})_{tA} = (1+1/\pi R_{av})^2 / (N+1+1/\pi R_{av})^2 \qquad (17)$$

For typical values such as $R_{av} = 2.5''$, $l = 10''$, N=3 the power loss ratio for the transversal dipole antenna is about 0.2.

Those skilled in the art will be able to devise other embodiments of the invention described herein which do not depart from the spirit of the invention. The invention should therefore be limited in scope only by the attached claims.

What is claimed is:

1. A electromagnetic logging tool for logging a wellbore, comprising:

an elongated sonde adapted for traversing said wellbore;

a source of alternating current;

an antenna connected to said source of alternating current;

a receiver circuit connected to said antenna, said receiver circuit providing an output corresponding to electromagnetic signals induced in said antenna; and at least one insulating insert disposed in an annular space between the exterior of said sonde and the wall of said wellbore, said at least one insert extending in a direction so as to segment paths of eddy currents which would otherwise flow in said annular space.

2. The electromagnetic logging tool as defined in claim 1 further comprising a magnet for inducing a static magnetic field in earth formations penetrated by said wellbore, and wherein said source of alternating current comprises a radio frequency pulse generator and said receiver comprises a radio frequency receiver adapted for measuring nuclear magnetic resonance signals from said earth formations.

3. The electromagnetic logging tool as defined in claim 1 wherein said antenna comprises an induction transmitter coil, said source of alternating current comprises power output magnitudes and frequencies suitable for induction resistivity logging, said antenna further comprises an induction receiver coil, and said receiver circuit is adapted to measure magnitudes of voltages induced in said receiver coil resulting from electromagnetic induction.

4. The electromagnetic logging tool as defined in claim 1 wherein said antenna comprises a longitudinal dipole extending substantially parallel to a longitudinal axis of said sonde, and said insert extends substantially along said longitudinal axis so as to segment said paths of eddy currents which would otherwise flow substantially perpendicular to said longitudinal axis.

5. The electromagnetic logging tool as defined in claim 4 wherein said antenna comprises a coil wound so that turns of said coil lie in planes substantially perpendicular to said longitudinal axis.

6. The electromagnetic logging tool as defined in claim 1 wherein said antenna comprises a transversal dipole extending substantially parallel to a longitudinal axis of said sonde, and said insert extends substantially perpendicular to said longitudinal axis and around a portion of the circumference of said sonde so as to segment said paths of eddy currents which would otherwise flow substantially parallel to said longitudinal axis.

7. The electromagnetic logging tool as defined in claim 6 wherein said antenna comprises a coil wound so that rams of said coil lie in planes substantially parallel to said longitudinal axis.

8. A nuclear magnetic resonance well logging apparatus, comprising:

a magnet for inducing a static magnetic field in earth formations penetrated by a wellbore;

means for generating a radio frequency magnetic field in said earth formations;

means for receiving nuclear magnetic resonance signals from said earth formations; and means for segmenting paths of eddy current flowing in an annular space between the exterior of said apparatus and the wall of said wellbore.

9. The apparatus as defined in claim 8 wherein said means for generating and said means for receiving comprise a longitudinal dipole antenna, and said means for segmenting comprises at least one insulating insert disposed in said annular space and extending substantially parallel to an axis of said longitudinal dipole antenna.

10. The apparatus as defined in claim 8 wherein said means for generating and said means for receiving comprise a transversal dipole antenna, and said means for segmenting comprises at least one insulating insert disposed in said annular space and extending substantially perpendicular to a longitudinal axis of said apparatus.

11. An electromagnetic induction well logging apparatus, comprising:

a sonde adapted to traverse a wellbore penetrating earth formations;

a source of alternating current;

a transmitter antenna disposed on said sonde and connected to said source of alternating current;

a receiver antenna disposed on said sonde axially spaced apart from said transmitter;

a receiver circuit connected to said receiver antenna; and means for segmenting paths of eddy currents which would otherwise flow in an annular space between said sonde and said wellbore.

12. The electromagnetic induction well logging apparatus as defined in claim 11 wherein said transmitter antenna and said receiver antenna each comprise a longitudinal dipole antenna, and said means for segmenting comprises at least one insulating insert extending parallel to a longitudinal axis of said longitudinal dipole antennas.

13. The electromagnetic induction well logging apparatus as defined in claim 11 wherein said transmitter antenna and said receiver antenna each comprise a transversal dipole, and said means for segmenting comprises at least one insulating insert extending perpendicular to a longitudinal axis of said transversal dipole antennas.

14. A method for electromagnetic logging earth formations penetrated by a wellbore having reduced effects of eddy current flowing in an annular space between a logging tool and said wellbore, comprising:

inserting said logging tool into said wellbore;

generating alternating electromagnetic fields in said earth formations by conducting alternating current through an antenna disposed in said logging tool;

electrically segmenting said wellbore so as to interrupt paths of eddy currents which would otherwise flow in said annular space, said eddy currents resulting from said alternating electromagnetic fields; and detecting signals in said antenna corresponding to interaction of said alternating electromagnetic fields with said earth formations.

15. The method as defined in claim 14 wherein said step of generating and said step of detecting respectively comprise generating and detecting nuclear magnetic resonance signals.

16. The method as defined in claim 14 wherein said step of generating and said step of detecting respectively comprise generating and detecting electromagnetic induction signals.

17. The method as defined in claim 14 wherein said antenna comprises a longitudinal dipole so that a magnetic component of said electromagnetic field is substantially parallel to an axis of said wellbore, and said step of electrically segmenting includes dividing said annular space into at least two radial compartments thereby segmenting one of said eddy current paths substantially perpendicular to said axis.

18. The method as defined in claim 14 wherein said antenna comprises a transversal dipole so that a magnetic component of said electromagnetic field extends substantially perpendicular to an axis of said wellbore and said step of electrically segmenting including dividing said annular space into at least two axial compartments thereby segmenting one of said eddy current path substantially parallel to said axis.

19. A method of nuclear magnetic resonance logging earth formations penetrated by a wellbore, comprising:

inserting a nuclear magnetic resonance logging apparatus into said wellbore;

inducing a static magnetic field in said earth formations;

generating a radio frequency magnetic field in said earth formations so as to excite nuclei of said formations;

electrically segmenting said an annular space between said logging apparatus and said wellbore so as to interrupt paths of eddy currents which would otherwise flow in said annular space; and detecting nuclear magnetic resonance signals induced by said excited nuclei in said earth formations.

20. The method as defined in claim 19 wherein said step of generating comprises passing radio frequency power through a longitudinal dipole antenna so that said radio frequency magnetic field is substantially parallel to an axis of said wellbore, and said step of electrically segmenting includes dividing said annular space into at least two radial compartments thereby segmenting an eddy current path substantially perpendicular to said axis.

21. The method as defined in claim 19 wherein said step of generating comprises passing radio frequency power through a transversal dipole antenna so that said radio frequency magnetic field extends substantially perpendicular to an axis of said wellbore and said step of electrically segmenting including dividing said annular space into at least two axial compartments thereby segmenting an eddy current path substantially parallel to said axis.

* * * * *